United States Patent
Kusunoki

(10) Patent No.: US 9,188,706 B2
(45) Date of Patent: Nov. 17, 2015

(54) OPTICAL ELEMENT

(75) Inventor: Yukihisa Kusunoki, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 472 days.

(21) Appl. No.: 13/634,228

(22) PCT Filed: Jun. 20, 2011

(86) PCT No.: PCT/JP2011/064012
§ 371 (c)(1),
(2), (4) Date: Sep. 11, 2012

(87) PCT Pub. No.: WO2012/049888
PCT Pub. Date: Apr. 19, 2012

(65) Prior Publication Data
US 2013/0016425 A1   Jan. 17, 2013

(30) Foreign Application Priority Data

Oct. 12, 2010 (JP) .................................. 2010-229516

(51) Int. Cl.
*G02B 1/113* (2015.01)
*G02B 1/115* (2015.01)
(52) U.S. Cl.
CPC ............... *G02B 1/113* (2013.01); *G02B 1/115* (2013.01)
(58) Field of Classification Search
CPC .......... G02B 5/26–5/289; G02B 5/02–5/0294; G02B 1/10–1/18; C03C 17/34–17/3494
USPC .......... 359/350–359, 577–590, 599, 601–614
See application file for complete search history.

(56) References Cited

U.S. PATENT DOCUMENTS

| | | | |
|---|---|---|---|
| 4,436,363 A | 3/1984 | Steinbruegge et al. | |
| 4,483,899 A * | 11/1984 | Kuwabara | 428/213 |
| 4,612,234 A * | 9/1986 | Miyata et al. | 428/215 |
| 5,243,458 A * | 9/1993 | Hatano et al. | 359/359 |
| 6,020,992 A * | 2/2000 | Georgiev et al. | 359/359 |
| 6,399,228 B1 * | 6/2002 | Simpson | 428/699 |

(Continued)

FOREIGN PATENT DOCUMENTS

| | | |
|---|---|---|
| CN | 1509490 A | 6/2004 |
| CN | 101464528 A | 6/2009 |

(Continued)

OTHER PUBLICATIONS

Notification of Reasons for Rejection in Japanese Patent Application No. 2010-229516, dated Sep. 26, 2014.

(Continued)

*Primary Examiner* — Derek S Chapel
*Assistant Examiner* — Jeffrey Madonna
(74) *Attorney, Agent, or Firm* — Venable LLP; Michael A. Sartori; F. Brock Riggs

(57) ABSTRACT

An optical element includes a substrate and an infrared anti-reflective film. The substrate is made of ZnSe, and the infrared anti-reflective film is formed on at least one surface of the substrate. The infrared anti-reflective film includes a low-refractive-index layer made of $BaF_2$, a high-refractive-index layer made of ZnSe, ZnS, or Ge, and an intermediate layer made of an amorphous or anisotropic material. With this structure, an optical element having a high transmittance and a small surface roughness can be produced without using $ThF_4$.

5 Claims, 1 Drawing Sheet

(56) References Cited

U.S. PATENT DOCUMENTS

| | | | |
|---|---|---|---|
| 6,603,601 B2* | 8/2003 | Iwamoto et al. | 359/358 |
| 2002/0080843 A1* | 6/2002 | Iwamoto et al. | 372/92 |
| 2010/0246013 A1* | 9/2010 | Youn et al. | 359/584 |

FOREIGN PATENT DOCUMENTS

| | | | |
|---|---|---|---|
| EP | 1 211 523 A2 | 6/2002 |
| JP | 63-294501 A | 12/1988 |
| JP | 06-313802 A | 11/1994 |
| JP | 2000-019305 A | 1/2000 |
| JP | 2000-117482 A | 4/2000 |
| JP | 2000-147205 A | 5/2000 |
| JP | 2002-148407 A | 5/2002 |
| JP | 2003-149406 A | 5/2003 |
| JP | 2006-072031 A | 3/2006 |
| JP | 2008-032804 A | 2/2008 |
| JP | 2009-086533 A | 4/2009 |
| JP | 2010-226067 A | 10/2010 |
| TW | 200612381 A | 4/2006 |
| WO | WO-2004/113966 A1 | 12/2004 |

OTHER PUBLICATIONS

Notification of Reasons for Rejection in Japanese Patent Application No. 2010-229516, dated Feb. 7, 2014.

Office Action in Chinese Patent Application No. 201180013633.0, dated Mar. 26, 2014.

Notification of the Office Action in Taiwanese Patent Application No. 100122067 dated Feb. 25, 2015.

* cited by examiner

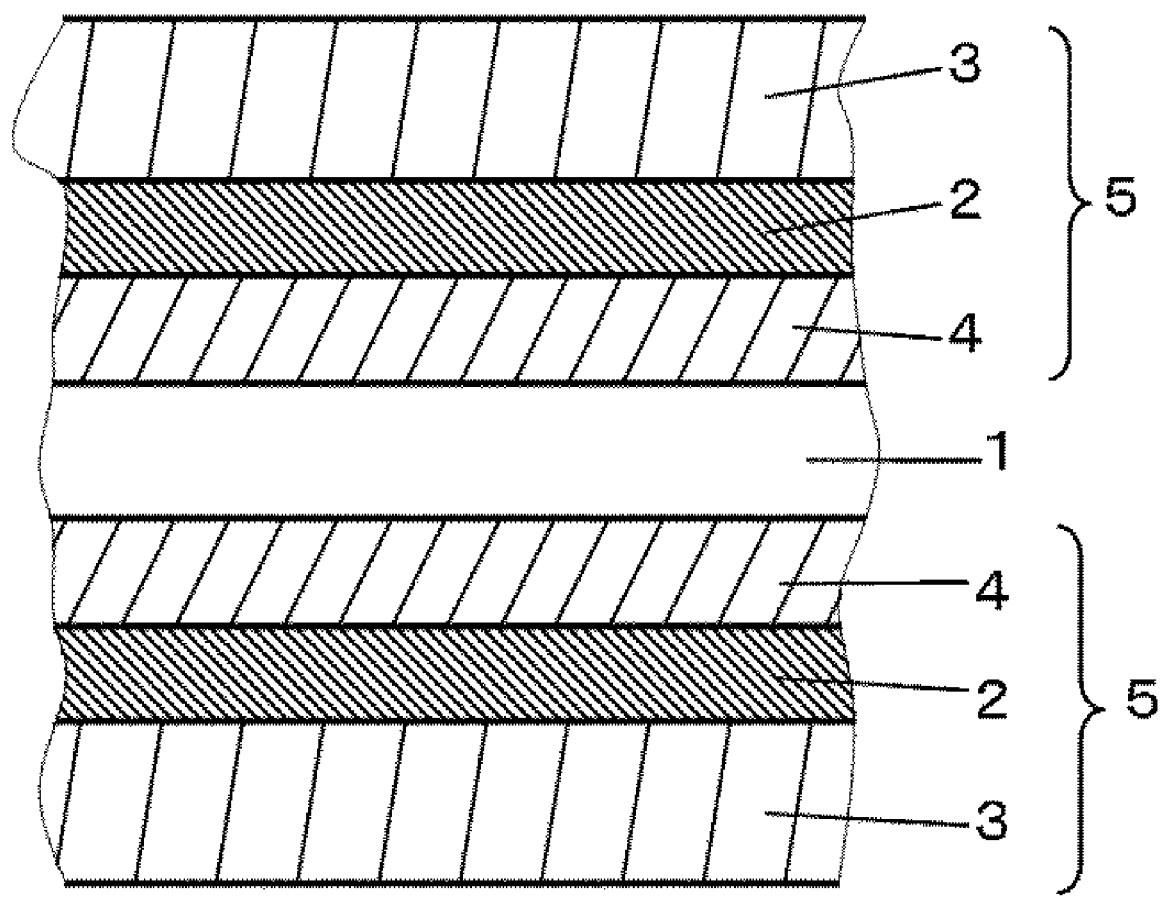

OPTICAL ELEMENT

TECHNICAL FIELD

The present invention relates to an optical element including a substrate having an infrared anti-reflective film on a surface thereof.

BACKGROUND ART

In recent years, optical devices using infrared light have been actively developed. In particular, infrared light in the range of 8 to 14 µm have been attracting attention. Accordingly, various optical elements suitable for infrared light in this range have been proposed. As an example of such an optical element, an optical element having an infrared anti-reflective function is known which includes a substrate (base member) and an infrared anti-reflective film provided on the substrate. The substrate is formed of an infrared transmitting material such as ZnSe, ZnS, GaAs, or Ge. The infrared anti-reflective film includes a low-refractive-index layer made of a fluoride such as $PbF_2$, $BaF_2$, $LaF_3$, $CeF_3$, or $ThF_4$, and a high-refractive-index layer made of, for example, ZnSe, ZnS, GaAs, or Ge.

In an optical element for use in a high-power laser, such as a $CO_2$ laser, the influence of heat generated when the laser light is absorbed cannot be ignored. Therefore, it is necessary to reduce the laser-light absorption of the infrared anti-reflective film. Among the materials for forming the low-refractive-index layer in the infrared anti-reflective film, $ThF_4$ is known as a material having such a characteristic. However, since $ThF_4$ is a radioactive material, there are problems that $ThF_4$ is harmful to humans and handling thereof is restricted.

To solve such a problem, Patent Literature 1 proposes an optical element including a low-refractive-index layer made of $BaF_2$ and a high-refractive-index layer made of ZnSe.

CITATION LIST

Patent Literature

PTL 1: JP2002-148407A

SUMMARY OF INVENTION

Technical Problem

With the structure according to Patent Literature 1, an optical element having a low laser-light absorption can be produced without using a radioactive material, such as $ThF_4$. However, in the structure according to Patent Literature 1 in which the low-refractive-index layer is simply made of $BaF_2$ and the high-refractive-index layer is simply made of ZnSe, the surface roughness of the infrared anti-reflective film is increased compared to that in the case where $ThF_4$ is used. As a result, the appearance of the optical element is adversely affected.

The present invention has been made in view of the above-described circumstances, and an object of the present invention is to provide an optical element including an infrared anti-reflective film which has a low laser-light absorption and a good appearance and is free from $ThF_4$, which is a radioactive material.

An optical element according to the present invention includes a substrate and an infrared anti-reflective film. The substrate includes ZnSe, and is formed on at least one surface of the substrate. The infrared anti-reflective film includes a low-refractive-index layer made mainly of $BaF_2$, a high-refractive-index layer made of ZnSe, ZnS, or Ge, and an intermediate layer made of an amorphous or anisotropic material. A surface roughness Ra of the optical element is 3 nm or less.

In the optical element of the present invention, a laser-light absorption at a wavelength of 10.6 µm is preferably 0.25% or less. More preferably, the laser-light absorption at the wavelength of 10.6 µm is 0.18% or more and 0.24% or less.

Preferably, the intermediate layer in the optical element according to the present invention is a layer made of one or more fluorides selected from the group consisting of a lanthanoid fluoride, $PbF_2$, and $YF_3$, or a layer made of a solid solution including one or more fluorides selected from the group consisting of the lanthanoid fluoride, $PbF_2$, and $YF_3$ and $BaF_2$.

In the optical element according to the present invention, the intermediate layer is preferably formed between the high-refractive-index layer and the low-refractive-index layer, between the low-refractive-index layer and the substrate, or both between the high-refractive-index layer and the low-refractive-index layer and between the low-refractive-index layer and the substrate.

Advantageous Effects of Invention

The present invention provides an optical element including an infrared anti-reflective film which has a low laser-light absorption and a good appearance and is free from $ThF_4$.

BRIEF DESCRIPTION OF DRAWINGS

FIG. 1 is a schematic cross-section illustrating an optical element according to an embodiment of the present invention.

DESCRIPTION OF EMBODIMENTS

The present inventor has studied the problems of the optical element disclosed in Patent Literature 1. As a result, it has been found that irregularities of grains on the surface of the substrate made of ZnSe, which is polycrystal, are transferred onto the $BaF_2$ layer either simply or in a magnified manner. In addition, it has also been found that the $BaF_2$ layer exhibits clear crystallinity. On the basis of these facts, the present inventor has assumed that the irregularities on the $BaF_2$ layer have an influence on the surface of the optical element and adversely affect the appearance of the optical element.

Accordingly, the present inventor has studied various countermeasures against the above-described problems, and found that an amorphous or anisotropic infrared transmitting layer may be formed on an upper or lower surface of a low-refractive-index layer 2. In other words, an optical element of the present invention is characterized in that an amorphous or anisotropic intermediate layer 4 is provided in addition to the low-refractive-index layer 2 made of $BaF_2$.

An embodiment of the present invention will now be described with reference to the accompanying drawing.

FIG. 1 is a schematic sectional view of an optical element according to the present invention. The optical element according to the present invention includes a substrate 1 made of ZnSe and an infrared anti-reflective film 5 including the low-refractive-index layer 2, which is made mainly of $BaF_2$, a high-refractive-index layer 3 made of ZnSe, ZnS, or Ge, and the amorphous or anisotropic intermediate layer 4 (which has no particular crystal orientation). The layer made mainly of $BaF_2$ includes a layer in which a certain amount of material other than $BaF_2$ is included but the crystallinity of the ZnSe substrate is transferred onto the layer if the layer is formed on the ZnSe substrate by vapor deposition.

Various materials may be used as the material of the intermediate layer 4. Preferably, the intermediate layer 4 is made of a fluoride (other than $BaF_2$) having a high infrared transmittance or a solid solution of $BaF_2$ and a fluoride other than $BaF_2$. The fluoride may contain two or more different materials. The fluoride is, of course, not $ThF_4$, and is preferably a lanthanoid fluoride such as $YbF_3$ or $DYF_3$, $YF_3$, or $PbF_2$. An amorphous layer may also be formed by using an oxide such as $TiO_2$. However, in such a case, it is difficult to set the absorption at a wavelength of 10.6 μm to 0.25% or less.

The intermediate layer 4 is preferably formed as a first intermediate layer between the low-refractive-index layer and the substrate. The thickness of the intermediate layer 4 is not restricted as long as transferring of the irregularities on the surface of the ZnSe substrate does not occur. For example, to set the surface roughness Ra to 3 nm or less, the thickness is preferably 10 nm or more. The laser-light absorption of $BaF_2$ is lower than those of other fluorides. Therefore, the intermediate layer, which is made of a fluoride other than $BaF_2$ or a solid solution of $BaF_2$ and a fluoride other than $BaF_2$ is preferably as thin as possible to make the laser-light absorption low. Accordingly, the thickness of the intermediate layer is preferably 1,000 nm or less, and more preferably, 100 nm or less. With this structure, the irregularities on the surface of the ZnSe substrate are not transferred onto the surface of the infrared anti-reflective film. As a result, the surface of the infrared anti-reflective film can be made smooth. According to the structure of the present invention, the surface roughness Ra of the infrared anti-reflective film can be set to 3 nm or less.

The intermediate layer may be formed so as to include a first intermediate layer formed between the low-refractive-index layer and the substrate and a second intermediate layer formed between the high-refractive-index layer and the low-refractive-index layer. In such a case, the thickness of the first intermediate layer is preferably small, more specifically, is preferably 10 nm or more and 100 nm or less. When the intermediate layer is additionally provided above the low-refractive-index layer, the laser-light absorption of the optical element can be controlled.

The optical element of the present invention will be further described by way of examples. However, the present invention is not restricted to the examples.

Example 1

An optical element having an infrared anti-reflective film 5 on each side thereof was formed by using an 8-mm-thick ZnSe member, which is a transmissive member, as a substrate 1 and successively stacking an intermediate layer 4 made of a solid solution of $BaF_2$ and $YF_3$ ($BaF_2$:$YF_3$=7:3 . . . molar ratio), a low-refractive-index layer 2 made of $BaF_2$, and a high-refractive-index layer 3 made of ZnSe on a surface of the substrate 1 at each side thereof. Each layer was formed by electron beam (EB) vapor deposition in which the degree of vacuum was $8 \times 10^{-4}$ Pa or less and the deposition rate was 0.03 μm/min. The infrared-ray absorption and the surface roughness of the optical element were measured. Table 1 shows the measurement results.

The infrared-ray absorption was measured by a laser calorimetry method using a $CO_2$ laser beam with a wavelength of 10.6 μm. The surface roughness was measured by using a non-contact surface profiler NewView 200 produced by Zygo Corporation.

Optical elements having other structures were also produced and evaluated in a similar manner. More specifically, the optical elements had the structure in which intermediate layers 4 made of a solid solution of $BaF_2$ and $YF_3$ ($BaF_2$:$YF_3$=7:3) were formed on either side of a low-refractive-index layer 2 on the surface of a substrate 1; the structure in which a low-refractive-index layer 2 made of $ThF_4$ was provided; and the structure in which no intermediate layer 4 made of a fluoride solid solution was provided.

TABLE 1

| | Sample No. 1 | | Sample No. 2 | | Sample No. 3 | | Sample No. 4 | |
|---|---|---|---|---|---|---|---|---|
| | Material | Thickness | Material | Thickness | Material | Thickness | Material | Thickness |
| Fourth Layer | | | ZnSe | 200 nm | | | | |
| Third Layer | ZnSe | 200 nm | F Solid Solution | 300 nm | | | | |
| Second Layer | $BaF_2$ | 1000 nm | $BaF_2$ | 700 nm | ZnSe | 200 nm | ZnSe | 200 nm |
| First Layer | F Solid Solution | 20 nm | F Solid Solution | 30 nm | $ThF_4$ | 1000 nm | $BaF_2$ | 1000 nm |
| Substrate | ZnSe | 8 mm | ZnSe | 8 mm | ZnSe | 8 mm | ZnSe | 8 mm |
| Absorption | 0.09% | | 0.19% | | 0.19% | | 0.09% | |
| Surface Roughness | 2.6 nm | | 2.2 nm | | 2.2 nm | | 5.5 nm | |

\* Absorption: value at wavelength of 10.6 μm, Surface Roughness: Ra, F Solid Solution: fluoride solid solution
\* Equivalent layers were also formed at the opposite side of the substrate.

As is clear from the results shown in Table 1, the performance of the structures of the present invention (Material Nos. 1 and 2), in which $BaF_2$ was used as the material of the low-refractive-index layers 2, was equivalent to that in the case where $ThF_4$ was used. In addition, compared to the structure of the related art in which no intermediate layer 4 was provided (Material No. 4), the surface roughness and the laser-light absorption were reduced.

The laser-light absorption of the sample in which the material of the low-refractive-index layer was simply changed from $ThF_4$ to $BaF_2$ (Sample No. 4) differs from that of the sample in which the material of the low-refractive-index layer was $ThF_4$ (Sample No. 3). Therefore, the amount of change in the refractive index of the substrate and the amount of thermal deformation caused when the temperature of the substrate increases owing to the absorption of the laser light differed from those in the optical element of the related art in which $ThF_4$ was used. As a result, the focus position was shifted and compatibility with the optical element in which $ThF_4$ was used was not provided. In contrast, according to the structure of the present invention (Sample No. 2), the intermediate layers were provided so that the laser-light absorption can be matched with that of the optical element in which the low-refractive-index layer was made of $ThF_4$. Thus, compatibility with the optical element in which $ThF_4$ is used can be provided. The laser-light absorption can be adjusted by changing the thicknesses of the intermediate layers.

Example 2

The laser-light absorption and the surface roughness were evaluated while changing the materials and thicknesses of the layers under the same conditions as those in Example 1. Tables 2 to 6 show the results of the evaluation.

TABLE 2

| | Sample No. | | | | | | | | | |
|---|---|---|---|---|---|---|---|---|---|---|
| | 5 | | 6 | | 7 | | 8 | | 9 | |
| | Material | Thickness | Material | Thickness | Material | Thickness | Material | Thickness | Material | Thickness |
| Fourth Layer | ZnSe | 200 nm | ZnS | 270 nm | ZnSe | 160 nm | ZnS | 220 nm | ZnSe | 160 nm |
| Third Layer | F Solid Solution | 850 nm | F Solid Solution | 780 nm | $YbF_3$ | 480 nm | $YbF_3$ | 450 nm | $YbF_3$ | 480 nm |
| Second Layer | $BaF_2$ | 200 nm | $BaF_2$ | 230 nm | $BaF_2$ | 700 nm | $BaF_2$ | 700 nm | $BaF_2$ | 700 nm |
| First Layer | F Solid Solution | 10 nm | F Solid Solution | 10 nm | F Solid Solution | 10 nm | F Solid Solution | 10 nm | F Solid Solution | 10 nm |
| Substrate | ZnSe | 8 mm | ZnSe | 8 mm | ZnSe | 8 mm | ZnSe | 8 mm | ZnSe | 8 mm |
| Absorption | 0.24% | | 0.24% | | 0.24% | | 0.24% | | 0.24% | |
| Surface Roughness | 1.7 nm | | 1.7 nm | | 1.7 nm | | 1.7 nm | | 1.7 nm | |

* Absorption: value at wavelength of 10.6 μm, Surface Roughness: Ra, F Solid Solution: fluoride solid solution
* Equivalent layers were also formed at the opposite side of the substrate.

TABLE 3

| | Sample No. | | | | | | | | | |
|---|---|---|---|---|---|---|---|---|---|---|
| | 10 | | 11 | | 12 | | 13 | | 14 | |
| | Material | Thickness | Material | Thickness | Material | Thickness | Material | Thickness | Material | Thickness |
| Fourth Layer | ZnS | 220 nm | ZnSe | 200 nm | ZnS | 270 nm | ZnSe | 160 nm | ZnS | 220 nm |
| Third Layer | $YbF_3$ | 450 nm | F Solid Solution | 850 nm | F Solid Solution | 810 nm | $YbF_3$ | 480 nm | $YbF_3$ | 450 nm |
| Second Layer | $BaF_2$ | 700 nm | $BaF_2$ | 200 nm | $BaF_2$ | 200 nm | $BaF_2$ | 700 nm | $BaF_2$ | 700 nm |
| First Layer | F Solid Solution | 10 nm | $YF_3$ | 10 nm | $YF_3$ | 10 nm | $YF_3$ | 10 nm | $YF_3$ | 10 nm |
| Substrate | ZnSe | 8 mm | ZnSe | 8 mm | ZnSe | 8 mm | ZnSe | 8 mm | ZnSe | 8 mm |
| Absorption | 0.24% | | 0.24% | | 0.24% | | 0.24% | | 0.24% | |
| Surface Roughness | 1.7 nm | | 1.7 nm | | 1.7 nm | | 1.7 nm | | 1.7 nm | |

* Absorption: value at wavelength of 10.6 μm, Surface Roughness: Ra, F Solid Solution: fluoride solid solution
* Equivalent layers were also formed at the opposite side of the substrate.

TABLE 4

| | Sample No. | | | | | | | | | |
|---|---|---|---|---|---|---|---|---|---|---|
| | 15 | | 16 | | 17 | | 18 | | 19 | |
| | Material | Thickness | Material | Thickness | Material | Thickness | Material | Thickness | Material | Thickness |
| Fourth Layer | ZnSe | 160 nm | ZnS | 220 nm | | | | | | |
| Third Layer | YF$_3$ | 480 nm | YF$_3$ | 450 nm | ZnSe | 250 nm | ZnS | 240 nm | ZnSe | 180 nm |
| Second Layer | BaF$_2$ | 700 nm | BaF$_2$ | 700 nm | BaF$_2$ | 980 nm | BaF$_2$ | 1000 nm | BaF$_2$ | 1000 nm |
| First Layer | YF$_3$ | 10 nm | YF$_3$ | 10 nm | F Solid Solution | 20 nm | F Solid Solution | 20 nm | YF$_3$ | 20 nm |
| Substrate | ZnSe | 8 mm | ZnSe | 8 mm | ZnSe | 8 mm | ZnSe | 8 mm | ZnSe | 8 mm |
| Absorption | 0.24% | | 0.24% | | 0.13% | | 0.14% | | 0.13% | |
| Surface Roughness | 1.7 nm | | 1.7 nm | | 1.7 nm | | 1.7 nm | | 1.7 nm | |

\* Absorption: value at wavelength of 10.6 μm, Surface Roughness: Ra, F Solid Solution: fluoride solid solution
\* Equivalent layers were also formed at the opposite side of the substrate.

TABLE 5

| | Sample No. | | | | | | | | | |
|---|---|---|---|---|---|---|---|---|---|---|
| | 20 | | 21 | | 22 | | 23 | | 24 | |
| | Material | Thickness | Material | Thickness | Material | Thickness | Material | Thickness | Material | Thickness |
| Fourth Layer | | | | | | | | | ZnSe | 200 nm |
| Third Layer | ZnS | 240 nm | ZnSe | 200 nm | ZnSe | 200 nm | ZnSe | 220 nm | F Solid Solution | 300 nm |
| Second Layer | BaF$_2$ | 1000 nm | F Solid Solution | 860 nm | BaF$_2$ | 1100 nm | BaF$_2$ | 50 nm | BaF$_2$ | 700 nm |
| First Layer | YF$_3$ | 20 nm | BaF$_2$ | 200 nm | F Solid Solution | 5 nm | F Solid Solution | 1050 nm | F Solid Solution | 30 nm |
| Substrate | ZnSe | 8 mm | ZnSe | 8 mm | ZnSe | 8 mm | ZnSe | 8 mm | ZnSe | 8 mm |
| Absorption | 0.14% | | 0.24% | | 0.12% | | 0.25% | | 0.15% | |
| Surface Roughness | 1.7 nm | | 4.6 nm | | 4.0 nm | | 1.7 nm | | 2.2 nm | |

\* Absorption: value at wavelength of 10.6 μm, Surface Roughness: Ra, F Solid Solution: fluoride solid solution
\* Equivalent layers were also formed at the opposite side of the substrate.
\* Molar ratio of F solid solution of Material No. 24 was 8:2

TABLE 6

| | Sample No. | | | |
|---|---|---|---|---|
| | 25 | | 26 | |
| | Material | Thickness | Material | Thickness |
| Fourth Layer | | | | |
| Third Layer | ZnSe | 200 nm | ZnSe | 160 nm |
| Second Layer | BaF$_2$ | 1000 nm | BaF$_2$ | 1200 nm |
| First Layer | F Solid Solution | 20 nm | F Solid Solution | 20 nm |
| Substrate | ZnSe | 10 mm | ZnSe | 8 mm |
| Absorption | 0.13% | | 0.13% | |
| Surface Roughness | 2.6 nm | | 2.6 nm | |

Absorption: value at wavelength of 10.6 μm,
Surface Roughness: Ra,
F Solid Solution: fluoride solid solution
Equivalent layers were also formed at the opposite side of the substrate.

It is clear from the results shown in Tables 2 to 6 that optical elements having low laser-light absorptions and good appearances can be obtained by forming the amorphous or anisotropic intermediate layers in addition to BaF$_2$. In Sample No. 21, the intermediate layer was formed only between the high-refractive-index layer and the low-refractive-index layer (second intermediate layer). Although the thickness of the intermediate layer is relatively large, the surface roughness is reduced only slightly. Therefore, it can be understood that the intermediate layer is preferably formed between the low-refractive-index layer and the substrate (first intermediate layer) to reduce the surface roughness.

The above-described examples merely exemplify the present invention, and the present invention is not restricted to the examples. It is needless to say that a person skilled in the art may make various modifications or changes without departing from the technical spirit of the present invention defined by the claims.

INDUSTRIAL APPLICABILITY

The present invention is particularly suitably applicable to an optical element for use in a high-power laser, such as a CO$_2$ laser.

REFERENCE SIGNS LIST

1 substrate made of ZnSe
2 low-refractive-index layer
3 high-refractive-index layer
4 intermediate layer
5 infrared anti-reflective film

The invention claimed is:

1. An optical element, comprising:
a substrate including ZnSe; and
an infrared anti-reflective film formed on the substrate including
a low-refractive-index layer made mainly of $BaF_2$,
a high-refractive-index layer made of ZnSe, ZnS, or Ge, and
an intermediate layer made of an amorphous or anisotropic material;
wherein a surface roughness Ra of the infrared anti-reflective film is 3 nm or less and an absorption of the infrared anti-reflective film at a wavelength of 10.6 μm is 0.25% or less;
wherein the intermediate layer is a layer made of one or more fluorides selected from the group consisting of a lanthanoid fluoride, $PbF_2$, and $YF_3$, or a layer made of a solid solution including one or more fluorides selected from the group consisting of the lanthanoid fluoride, $PbF_2$, and $YF_3$, and $BaF_2$; and
wherein the infrared anti-reflective film has only one high-refractive-index layer and the high-refractive-index layer is formed on an outermost surface of the infrared anti-reflective film.

2. The optical element according to claim 1, wherein the absorption at the wavelength of 10.6 μm is 0.18% or more and 0.24% or less.

3. The optical element according to claim 1, wherein the intermediate layer includes a first intermediate layer formed between the low-refractive-index layer and the substrate.

4. The optical element according to claim 3, wherein a thickness of the first intermediate layer is 10 nm or more.

5. The optical element according to claim 3, wherein a thickness of the first intermediate layer is 1,000 nm or less.

* * * * *